(12) United States Patent
Nagasawa et al.

(10) Patent No.: US 11,618,406 B2
(45) Date of Patent: Apr. 4, 2023

(54) OCCUPANT PROTECTION SYSTEM

(71) Applicant: SUBARU CORPORATION, Tokyo (JP)

(72) Inventors: Isamu Nagasawa, Tokyo (JP); Junichi Oorai, Tokyo (JP); Takuya Tamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 78 days.

(21) Appl. No.: 17/212,603

(22) Filed: Mar. 25, 2021

(65) Prior Publication Data
US 2021/0316694 A1   Oct. 14, 2021

(30) Foreign Application Priority Data
Apr. 13, 2020 (JP) .............................. JP2020-071993

(51) Int. Cl.
*B60R 21/231* (2011.01)
*B60R 21/233* (2006.01)

(52) U.S. Cl.
CPC ...... *B60R 21/23138* (2013.01); *B60R 21/233* (2013.01); *B60R 2021/23146* (2013.01)

(58) Field of Classification Search
CPC ............ B60R 21/23138; B60R 21/233; B60R 2021/23146; B60R 2021/23107; B60R 21/232
See application file for complete search history.

(56) References Cited

U.S. PATENT DOCUMENTS

| | | | | |
|---|---|---|---|---|
| 5,730,464 A | * | 3/1998 | Hill .................... | B60R 21/23138 280/730.2 |
| 5,738,407 A | * | 4/1998 | Locke .................. | B60R 21/207 297/216.12 |
| 5,782,529 A | * | 7/1998 | Miller, III ............. | B60R 21/207 297/216.12 |
| 2012/0235388 A1 | * | 9/2012 | Suzuki ................ | B60R 21/2338 280/730.2 |
| 2018/0111582 A1 | * | 4/2018 | Moberg ............ | B60R 21/23138 |
| 2022/0126779 A1 | * | 4/2022 | Kobayashi ........ | B60R 21/23138 |

FOREIGN PATENT DOCUMENTS

| | | | |
|---|---|---|---|
| JP | 2012-096628 A | 5/2012 | |
| WO | WO-2007099667 A1 * | 9/2007 | ........... B60R 21/207 |

* cited by examiner

*Primary Examiner* — Karen Beck
(74) *Attorney, Agent, or Firm* — McGinn I.P. Law Group, PLLC.

(57) ABSTRACT

An occupant protection system includes a first airbag device, a second airbag device, and an airbag control processor. The first airbag device includes a first bag. The first bag is configured to be deployed along a side surface of a compartment of a vehicle upon a side impact of the vehicle. The second airbag device includes a second bag. The second bag includes a shoulder pressing part. The shoulder pressing part is configured to be deployed between a seat back and a shoulder, of an occupant, on an outer side in a vehicle width direction. The airbag control processor is configured to control deployment and non-deployment of the shoulder pressing part of the second airbag device in accordance with a state of the side impact of the vehicle.

20 Claims, 6 Drawing Sheets

OCCUPANT PROTECTION SYSTEM

CROSS-REFERENCE TO RELATED APPLICATIONS

The present application claims priority from Japanese Patent Application No. 2020-071993 filed on Apr. 13, 2020, the entire contents of which are hereby incorporated by reference.

BACKGROUND

The technology relates to an occupant protection system that uses a plurality of airbag devices.

There is known a curtain airbag device that includes a curtain bag and an inflator. The curtain bag is configured to be deployed along a side surface of a vehicle compartment. The inflator generates a gas for inflating the curtain bag. Such a curtain airbag device is disposed along a roof side rail which is a skeleton part of a vehicle body. For example, see Japanese Unexamined Patent Application Publication No. 2012-096628. In a case where a sensor detects a side impact of a vehicle, the curtain airbag device causes the inflator to generate the gas, and thereby so deploys the curtain bag that the curtain bag is inflated downward. The curtain bag thus covers a part such as a window of the side surface of the vehicle.

SUMMARY

An aspect of the technology provides an occupant protection system that includes a first airbag device, a second airbag device, and an airbag control processor. The first airbag device includes a first bag. The first bag is configured to be deployed along a side surface of a compartment of a vehicle upon a side impact of the vehicle. The second airbag device includes a second bag. The second bag includes a shoulder pressing part. The shoulder pressing part is configured to be deployed between a seat back and a shoulder, of an occupant, on an outer side in a vehicle width direction. The airbag control processor is configured to control deployment and non-deployment of the shoulder pressing part of the second airbag device in accordance with a state of the side impact of the vehicle.

An aspect of the technology provides an occupant protection system that includes a first airbag device, a second airbag device, and circuitry. The first airbag device includes a first bag. The first bag is configured to be deployed along a side surface of a compartment of a vehicle upon a side impact of the vehicle. The second airbag device includes a second bag. The second bag includes a shoulder pressing part. The shoulder pressing part is configured to be deployed between a seat back and a shoulder, of an occupant, on an outer side in a vehicle width direction. The circuitry is configured to control deployment and non-deployment of the shoulder pressing part of the second airbag device in accordance with a state of the side impact of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

In a case of a local side impact involving coming into contact with an object having a relatively small width such as a utility pole, a part of a vehicle body may be sometimes locally deformed, resulting in a great change in shape of a side surface of a vehicle compartment. In such a case, a curtain bag is deployed along the deformed side surface of the vehicle compartment. Usually, the curtain bag is to be deployed to extend substantially in a front-rear direction in a side region of the occupant. However, in the case described above, if the vehicle body is deformed toward the inner side of the vehicle compartment in front of an occupant, the curtain bag may be shifted from the predetermined deployment position, and be deployed to be inclined obliquely from the side region of the occupant toward the inner-front of the occupant in a top view. In this case, the head of the occupant may come into contact with the curtain bag earlier than the body of the occupant, which may cause the head to receive rotation that is to be received by the body. This may increase an injury rate.

To address this, it is desirable to provide an occupant protection system using a plurality of airbag devices that makes it possible to appropriately protect a head of an occupant also in a case of a local side impact involving coming into contact with an object having a relatively small width.

In the following, some embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

Figure 1:
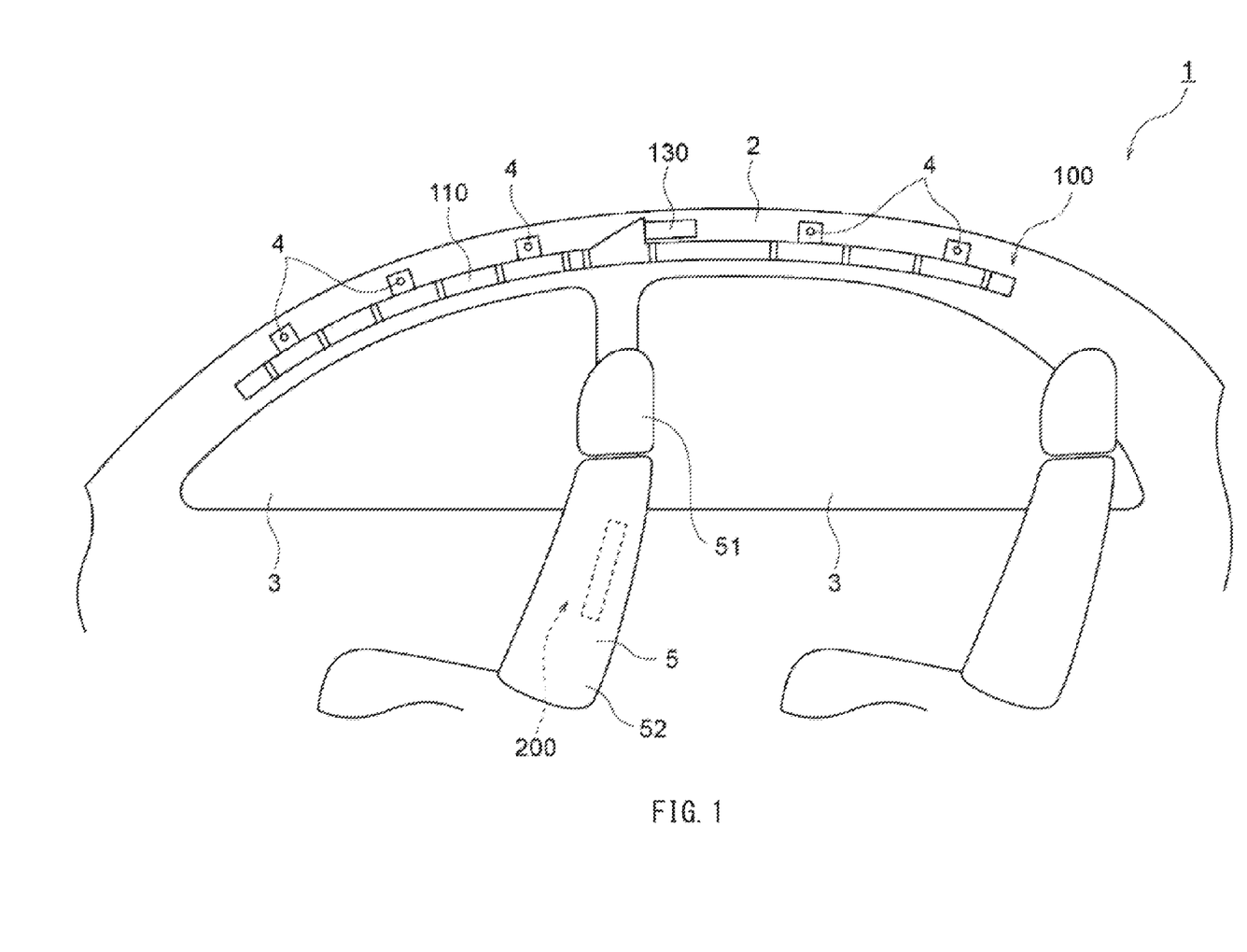
FIG. 1 is a side view of an example of non-deployed states of a curtain airbag device and a side airbag device in a vehicle compartment according to one embodiment of the technology.
Figure 2:
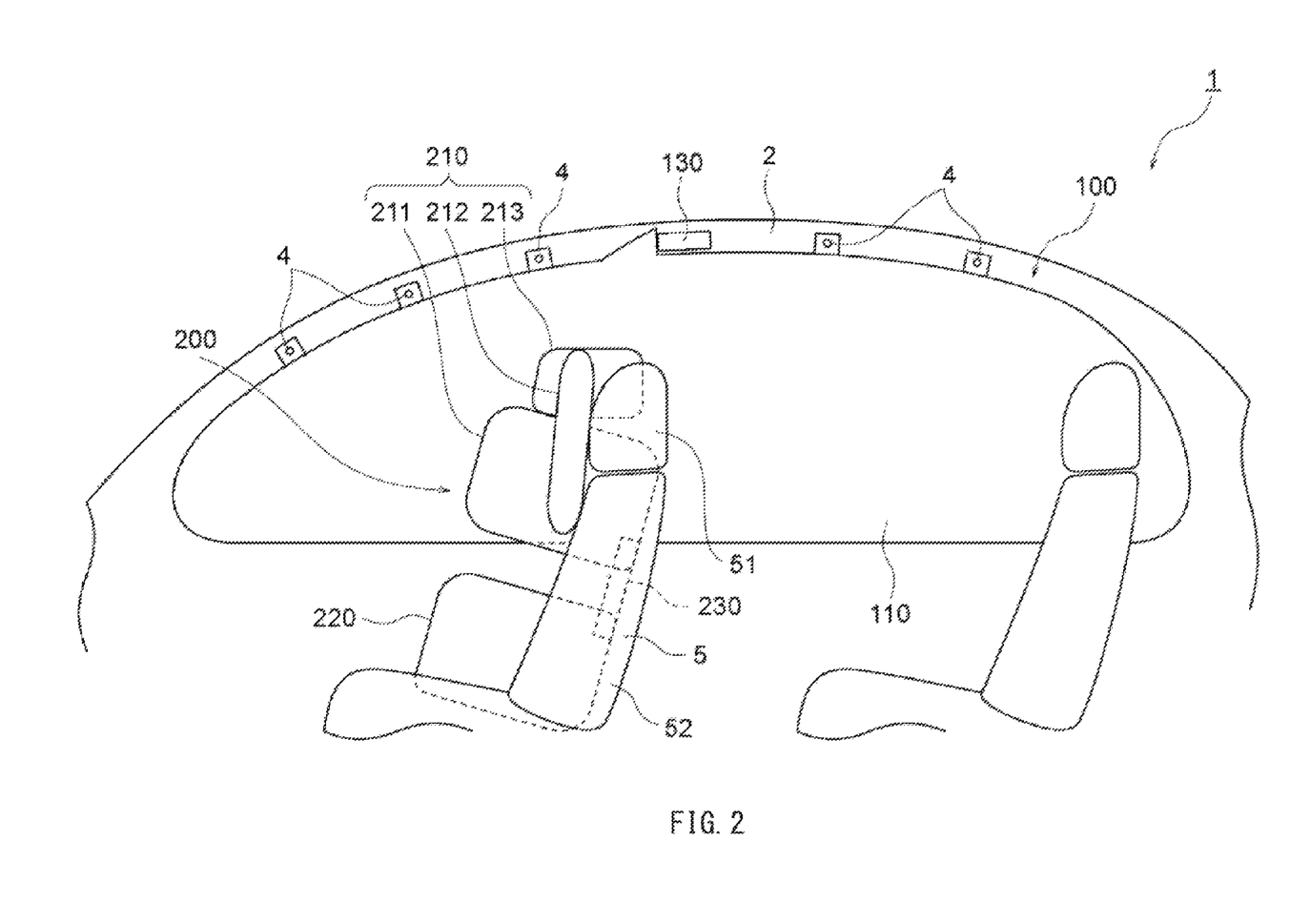
FIG. 2 is a side view of an example of deployed states of the curtain airbag device and the side airbag device in a case of a side impact.
Figure 3:
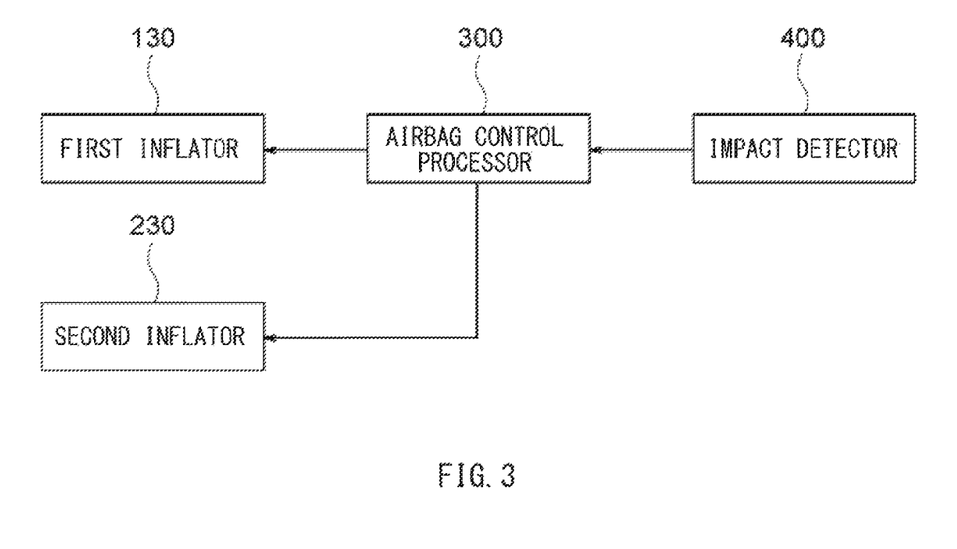
FIG. 3 is a control block diagram illustrating an example of an occupant protection system.
Figure 4:
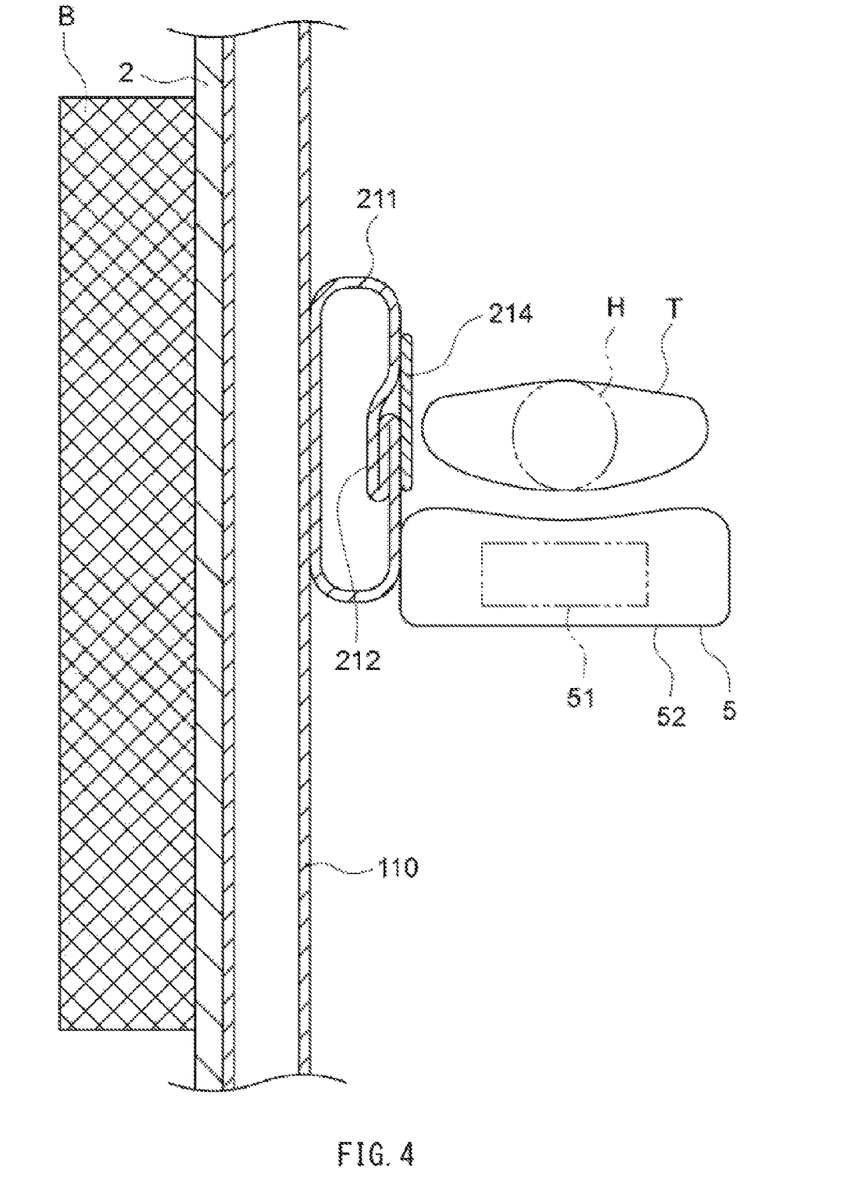
FIG. 4 is a plan view of an example of deployed states of a first bag and a second bag at a height near a body of an occupant in a case of a usual side impact.
Figure 5:
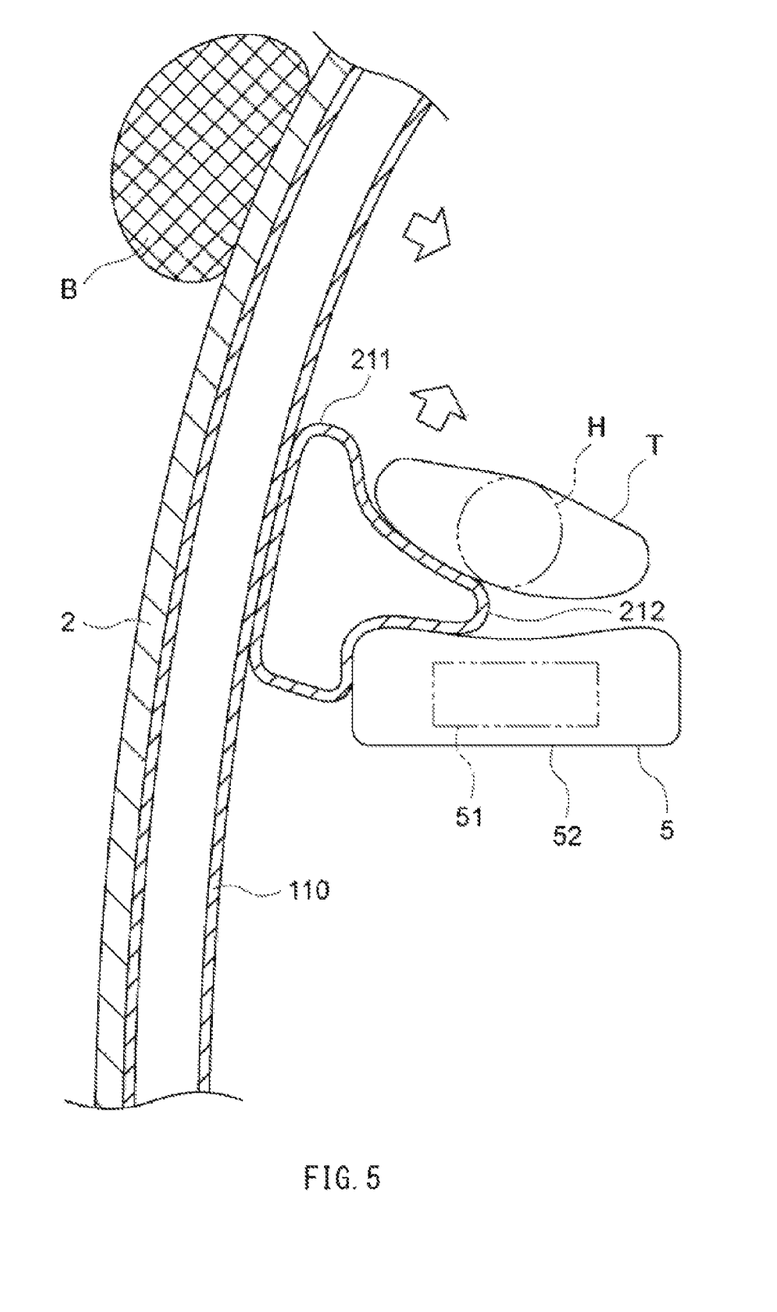
FIG. 5 is a plan view of an example of deployed states of the first bag and the second bag at the height near the body of the occupant in the case of a local side impact.
Figure 6:
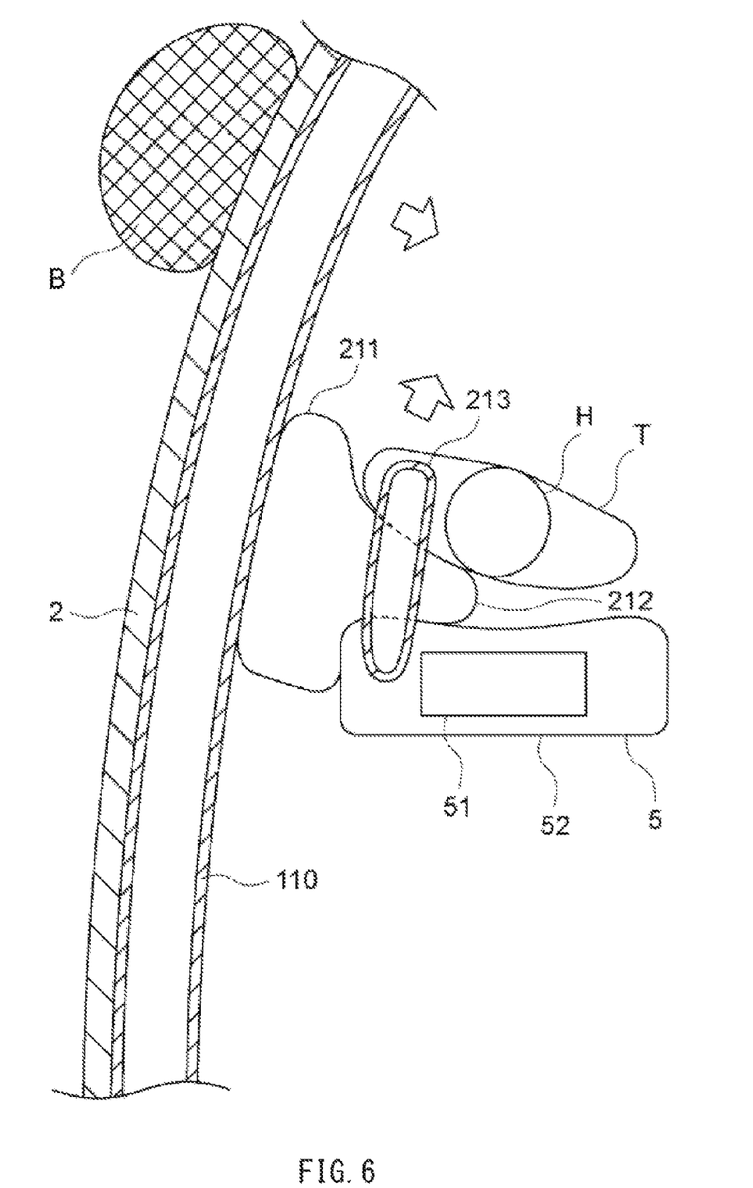
FIG. 6 is a plan view of an example of deployed states of the first bag and the second bag at a height near a head of the occupant in the case of the local side impact.

FIGS. 1 to 6 each illustrate an example embodiment of the technology. FIG. 1 illustrates a side view of an example of non-deployed states of a curtain airbag device and a side airbag device in a vehicle compartment. FIG. 2 is a side view of an example of deployed states of the curtain airbag device and the side airbag device in a case of a side impact. FIG. 3 is a control block diagram of an example of an occupant protection system. FIG. 4 is a plan view of an example of deployed states of a first bag and a second bag at a height near a body of an occupant in a case of a usual side impact. FIG. 5 is a plan view of an example of deployed states of the first bag and the second bag at the height near the body of the occupant in the case of the local side impact. FIG. 6 is a plan view of an example of deployed states of the first bag and the second bag at a height near a head of the occupant in the case of the local side impact.

Referring to FIG. 1, an occupant protection system 1 may include a curtain airbag device 100 and a side airbag device 200. The curtain airbag device 100 may be disposed along a roof side rail 2 that is a skeleton part of a vehicle body and extends substantially in a front-rear direction. The curtain airbag device 100 may include a first bag 110 and a first inflator 130. The first bag 110 may have a curtain-like shape and may be configured to be so deployed along a side surface of the vehicle compartment as to cover a window 3 on the side surface of the vehicle. The first inflator 130 may generate a gas for inflating the first bag 110. The first bag 110 may include sheet-shaped cloth. The first bag 110 may be folded or rolled to be shaped into a long shape along the roof side rail 2. The first bag 110 may be attached to the roof side rail 2 by means of a plurality of fixing tags 4. As illustrated in FIG. 1, the fixing tags 4 may be disposed side by side in the front-rear direction in a region on an upper side of a head restraint 51 of a seat 5. Referring to FIG. 2, upon a side impact of the vehicle, the first inflator 130 may supply the gas to the first bag 110, thereby so deploying the first bag 110 that the first bag 110 is inflated downward.

The side airbag device 200 may be disposed inside a seat back 52 of the seat 5. The side airbag device 200 may include a second bag 210, a third bag 220, and a second inflator 230. The second bag 210 and the third bag 220 may each be configured to be deployed on an outer side of the occupant in a vehicle width direction. The second inflator 230 may be configured to inflate each of the second bag 210 and the third bag 220. The second bag 210 and the third bag 220 may each include sheet-shaped cloth, and may each be folded or rolled to be contained in the seat back 52 together with the second inflator 230. In the example embodiment, the second bag 210 and the third bag 220 may be deployed in a state where the second bag 210 and the third bag 220 are separated away from each other in an upper-lower direction. As illustrated in FIG. 2, upon a side impact of the vehicle, the second inflator 230 may supply a gas to each of the second bag 210 and the third bag 220, thereby so deploying each of the second bag 210 and the third bag 220 that each of the second bag 210 and the third bag 220 is inflated in a side region of the occupant. In the example embodiment, the second inflator 230 may have respective gas injection holes at upper and lower ends. The second inflator 230 may supply the gas to the second bag 210 from the gas injection hole at the upper end, and supply the gas to the third bag 220 from the gas injection hole at the lower end.

Referring to FIG. 3, the first inflator 130 and the second inflator 230 may each be coupled to an airbag control processor 300. The first inflator 130 may generate the gas on the basis of a signal supplied from the airbag control processor 300, and control gas pressure in the first bag 110. The second inflator 230 may generate the gas on the basis of a signal supplied from the airbag control processor 300, and control gas pressure in each of the second bag 210 and the third bag 220. The airbag control processor 300 may be coupled to an impact detector 400, and may determine respective amounts of the gases to be generated by the first inflator 130 and the second inflator 230 in accordance with an impact state of the vehicle. The impact detector 400 may include, for example but not limited to, an acceleration sensor and a camera that are provided in the vehicle. In the example embodiment, the airbag control processor 300 may determine whether the impact state of the vehicle is: a usual side impact involving coming into contact with an object having a relatively great width; or a local side impact involving coming into contact with an object having a relatively small width. In a case of the local side impact, the airbag control processor 300 may increase the amount of the gas to be generated by the second inflator 230 compared with that in a case of the usual side impact, thereby increasing gas pressure in each of the second bag 210 and the third bag 220. In the example embodiment, in a case where it is determined that the local side impact involves contact with an object in front of the occupant, for example, the airbag control processor 300 may increase the amount of the gas to be generated by the second inflator 230.

As illustrated in FIG. 2, the second bag 210 may include a body part 211, a shoulder pressing part 212, and a side deployed part 213. The body part 211 may be deployed between the occupant and a part of the vehicle body such as a door. The shoulder pressing part 212 may be deployed between the seat back 52 and a shoulder of the occupant on an outer side in the vehicle width direction. The side deployed part 213 may be deployed in a side region of a head of the occupant. When the second bag 210 receives the gas from the second inflator 230, the body part 211, the shoulder pressing part 212, and the side deployed part 213 may be deployed in this order. Referring to FIG. 4, the second bag 210 may include a tether 214. The tether 214 may limit deployment of each of the shoulder pressing part 212 and the side deployed part 213. When the tether 214 is cut, the deployment of each of the shoulder pressing part 212 and the side deployed part 213 may be allowed. The tether 214 may be so set that the cutting of the tether 214 is not achieved by the amount of the gas supplied from the second inflator 230 upon the usual side impact and is achieved by the amount of the gas supplied from the second inflator 230 upon the local side impact. As described above, the airbag control processor 300 may control deployment and non-deployment of each of the shoulder pressing part 212 and the side deployed part 213 in accordance with a state of the side impact of the vehicle.

A description is given below of operation to be performed by the occupant protection system 1 having the above-described configuration in the case of a side impact.

In a case where the impact detector 400 detects a side impact, the airbag control processor 300 may determine whether the detected side impact is the usual side impact or the local side impact. In a case where the detected side impact is determined as the usual side impact, the airbag control processor 300 may cause each of the first inflator 130 and the second inflator 230 to generate the gas of an amount for the usual side impact, thereby deploying each of the first bag 110, the second bag 210, and the third bag 220. In this case, although the body part 211 of the second bag 210 is inflated, the tether 214 may not be cut. Therefore, each of the shoulder pressing part 212 and the side deployed part 213 may not be deployed. As illustrated in FIG. 4, in a case of the usual side impact, the vehicle may come into contact with an object B having a relatively great width. Therefore, the vehicle body may be pressed by the object B, and the vehicle body as a whole may be thereby deformed toward the inner side of the vehicle compartment while maintaining a state of extending substantially in the front-rear direction. Accordingly, the first bag 110 of the curtain airbag device 100 may be so deployed as to extend substantially in the front-rear direction in the side region of the occupant.

In contrast, in a case of the local side impact, the vehicle may come into contact with an object B having a relatively small width. Therefore, a part of the vehicle body may be locally deformed, resulting in a great change in shape of the side surface of the vehicle compartment. Referring to FIG. 5, in a case where the vehicle body is deformed toward the inner side of the vehicle compartment in front of the occupant, a deployment position of the first bag 110 may be shifted from a predetermined deployment position illustrated in FIG. 4. For example, as in a top view illustrated in FIG. 5, the first bag 110 may be deployed to be inclined obliquely from the side region of the occupant toward the inner-front of the occupant. In this case, if the sitting occupant is facing frontward, the first bag 110 may obliquely approach the occupant from the front. This may lead to a possibility that a head H of the occupant comes into contact with the first bag 110 earlier than a body T of the occupant.

In a case where the side impact is determined as the local side impact described above, the airbag control processor 300 may cause the second inflator 230 to generate a gas of an amount greater than that in the case of the usual side impact. This may cut the tether 214 upon the inflation of the second bag 210, allowing for the deployment of each of the shoulder pressing part 212 and the side deployed part 213. As illustrated in FIG. 5, upon the deployment of the shoulder pressing part 212, the deployed shoulder pressing part 212 may press the shoulder of the occupant on the outer side in the vehicle width direction toward the front, thereby allowing the attitude of the occupant to be changed obliquely toward the inner-front. As a result, the first bag 110 may approach the occupant relatively from his or her side. This helps to prevent the head H of the occupant from coming into contact with the first bag 110 earlier than the body T of the occupant. Accordingly, it is possible to appropriately protect the head H of the occupant also in the case of the local side impact.

Referring to FIG. 6, in addition to the above, the side deployed part 213 may be deployed in a side region of the head H of the occupant. This helps to effectively protect the head H of the occupant in a case where an object comes into the vehicle compartment or the vehicle body is deformed toward the vehicle compartment. Further, according to the example embodiment, the shoulder pressing part 212 and the side deployed part 213 may be included in the second bag 210 of the side airbag device 200. This helps to make it unnecessary to additionally install a new airbag device on the seat 5, thereby helping to prevent an increase in number of parts and helping to make it unnecessary to secure a new space in the seat 5.

Although the example embodiment has been described with reference to an example case where the second inflator 230 is controlled to increase the pressure in the second bag 210 and thereby cut the tether 214, this is non-limiting. In another example embodiment, an auxiliary inflator that operates only upon the local side impact may be provided in addition to the second inflator 230. In this case, a cutter may be coupled to a piston which is driven by a gas generated by the auxiliary inflator, and the cutter may cut the tether 214.

In still another example embodiment, no tether may be used, and instead, a configuration may be provided in which a vent hole, configured to be opened with predetermined pressure or greater, allows a gas to flow from the body part 211 of the second bag 210 to the shoulder pressing part 212 of the second bag 210. That is, any configuration may be provided as long as the configuration allows the deployment and the non-deployment of the shoulder pressing part 212 to be controlled in accordance with the state of the side impact of the vehicle.

Moreover, although the example embodiment has been described with reference to an example case where the side airbag device 200 may include the two bags, i.e., the second bag 210 and the third bag 220 that are deployed in the state where the second bag 210 and the third bag 220 are separated away from each other in the upper-lower direction, this is non-limiting. In one example embodiment, the side airbag device 200 may deploy only one bag. In another example embodiment, the shoulder pressing part and the side deployed part may be provided not as the bag or the bags of the side air bag device, but as a bag or bags of another airbag device different from the side airbag device. Moreover, although the example embodiment has been described with reference to an example case where the side deployed part 213 may be provided, this is non-limiting. In one example embodiment, the side deployed part 213 may be omitted.

Although some embodiments of the technology have been described in the foregoing by way of example, the technology is by no means limited to the embodiments described above. Note that not all of the combinations of the configurations described above in the example embodiments are necessary to solve an issue related to the embodiment of the technology.

The airbag control processor 300 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the airbag control processor 300 illustrated in FIG. 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the airbag control processor 300 illustrated in FIG. 3.

The invention claimed is:
1. An occupant protection system comprising:
a first airbag device including a first bag, the first bag being configured to be deployed along a side surface of a compartment of a vehicle upon a side impact of the vehicle;
a second airbag device including a second bag, the second bag including a shoulder pressing part, the shoulder pressing part being configured to be deployed i) between a seat back and a shoulder, of an occupant, on an outer side in a vehicle width direction and ii) between a head restraint and a head of the occupant; and an airbag control processor configured to control deployment and non-deployment of the shoulder pressing part of the second airbag device in accordance with a type of the side impact of the vehicle.

2. The occupant protection system according to claim 1, wherein the airbag control processor is configured to control the deployment and the non-deployment of the shoulder pressing part of the second airbag device on a basis of a signal supplied from an impact detector, the impact detector being configured to detect an impact state of the vehicle.

3. The occupant protection system according to claim 2, wherein the first airbag device comprises a curtain airbag device, the second airbag device comprises a side airbag device, the second bag includes a body part configured to be deployed in a side region of the occupant.

4. The occupant protection system according to claim 3, wherein the side airbag device includes two bags that are configured to be deployed in a state where the two bags are separated away from each other in an upper-lower direction, and the second bag comprises one, of the two bags of the side airbag device, that is configured to be deployed on an upper side.

5. The occupant protection system according to claim 1, wherein the second bag includes a side deployment part configured to be deployed in a side region of the head of the occupant.

6. The occupant protection system according to claim 2, wherein the second bag includes a side deployment part configured to be deployed in a side region of the head of the occupant.

7. The occupant protection system according to claim 3, wherein the second bag includes a side deployment part configured to be deployed in a side region of the head of the occupant.

8. The occupant protection system according to claim 4, wherein the second bag includes a side deployment part configured to be deployed in a side region of the head of the occupant.

9. An occupant protection system comprising:

a first airbag device including a first bag, the first bag being configured to be deployed along a side surface of a compartment of a vehicle upon a side impact of the vehicle;

a second airbag device including a second bag, the second bag including a shoulder pressing part, the shoulder pressing part being configured to be deployed i) between a seat back and a shoulder, of an occupant, on an outer side in a vehicle width direction and ii) between a head restraint and a head of the occupant; and circuitry configured to control deployment and non-deployment of the shoulder pressing part of the second airbag device in accordance with a type of the side impact of the vehicle.

10. The occupant protection system according to claim 1, wherein the type of the side impact includes at least a local side impact different than a normal side impact.

11. The occupant protection system according to claim 10, wherein the airbag control processor determines the local side impact to control the deployment of the shoulder pressing part, and determines the normal side impact to control the non-deployment of the shoulder pressing part.

12. The occupant protection system according to claim 1, wherein the second bag includes a tether to limit deployment of each of the shoulder pressing part and a side deployed part.

13. The occupant protection system according to claim 9, wherein the circuitry is configured to control the deployment and the non-deployment of the shoulder pressing part of the second airbag device on a basis of a signal supplied from an impact detector, the impact detector being configured to detect an impact type of the vehicle.

14. The occupant protection system according to claim 9, wherein the type of the side impact includes at least a local side impact different than a normal side impact.

15. The occupant protection system according to claim 9, wherein the circuitry determines the local side impact to control the deployment of the shoulder pressing part, and determines the normal side impact to control the non-deployment of the shoulder pressing part.

16. A method of an occupant protection system, the method comprising:

sending a first signal to deploy a first airbag device including a first bag, along a side surface of a compartment of a vehicle upon a side impact of the vehicle;

sending a second signal, separate from the first signal, to deploy a shoulder pressing part i) between a seat back and a shoulder, of an occupant, on an outer side in a vehicle width direction and ii) between a head restraint and a head of the occupant, wherein a second airbag device including a second bag, the second bag including the shoulder pressing part; and controlling deployment and non-deployment of the shoulder pressing part of the second airbag device in accordance with a determination of a type of the side impact of the vehicle.

17. The method according to claim 16, wherein the controlling of the deployment and the non-deployment of the shoulder pressing part of the second airbag device is on a basis of a signal supplied from an impact detector by a processor to determine the type of the side impact, the impact detector being configured to detect an impact type of the vehicle.

18. The method according to claim 16, wherein the type of the side impact includes at least a local side impact that is different than a normal side impact.

19. The method according to claim 18, further comprising determining the local side impact to control the deployment of the shoulder pressing part.

20. The method according to claim 19, further comprising determining the normal side impact to control the non-deployment of the shoulder pressing part.

* * * * *